Nov. 3, 1931.                    E. BUCKINGHAM                    1,830,087
              INSTRUMENT FOR EXHIBITING A FUNCTION OF A VARIABLE
                        Filed April 16, 1928        2 Sheets-Sheet 1
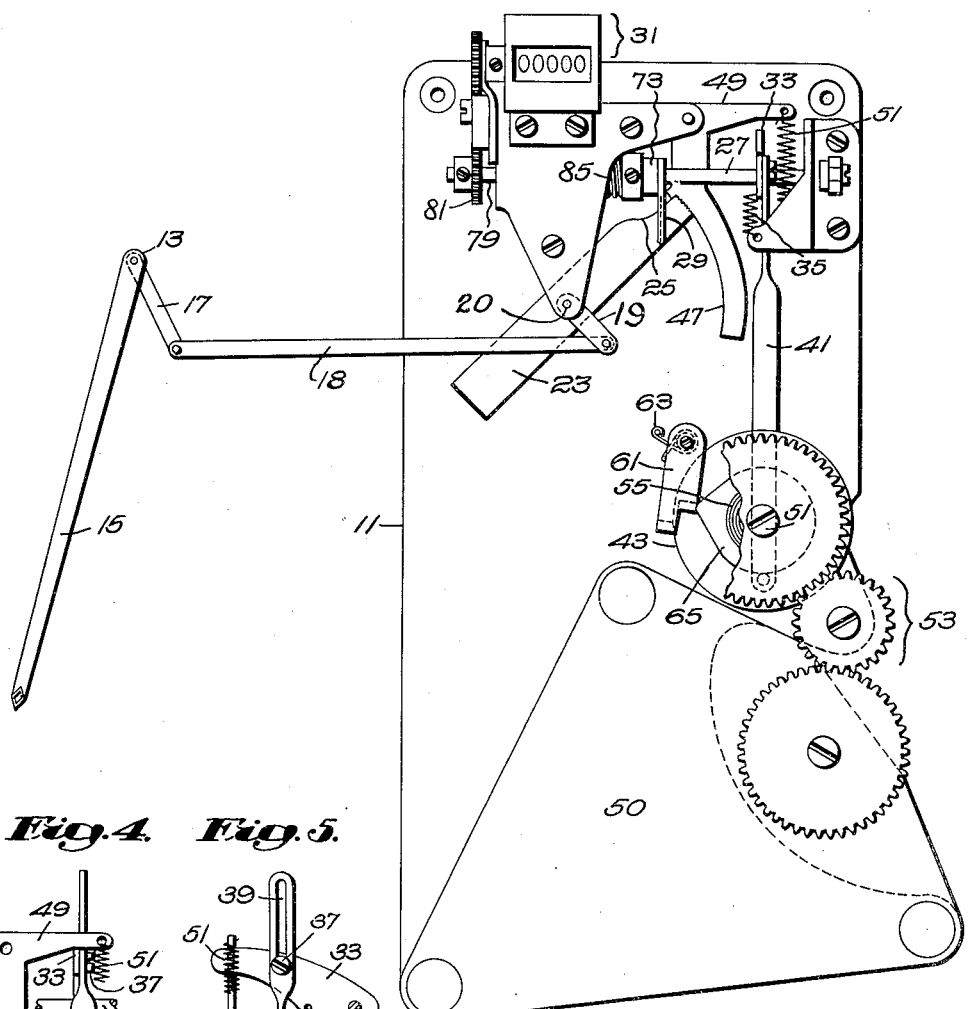
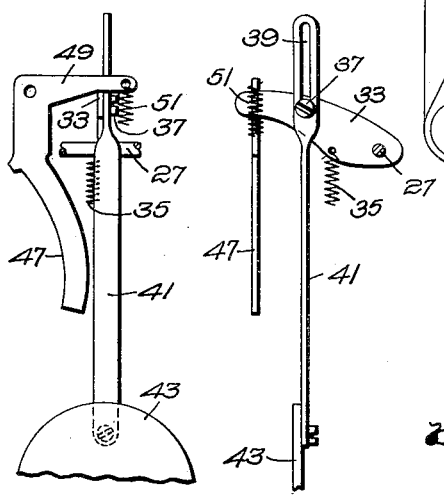
Inventor:
Earle Buckingham
by Emery, Booth, Janney & Varney
Attys Nov. 3, 1931.  E. BUCKINGHAM  1,830,087
INSTRUMENT FOR EXHIBITING A FUNCTION OF A VARIABLE
Filed April 16, 1928  2 Sheets-Sheet 2
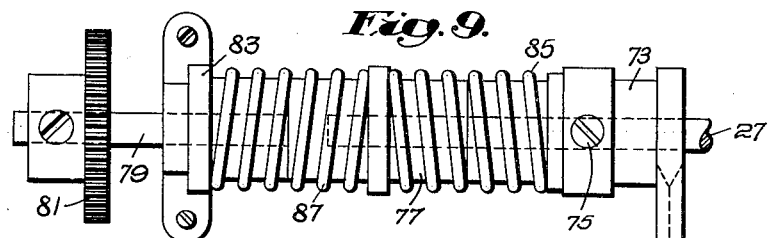
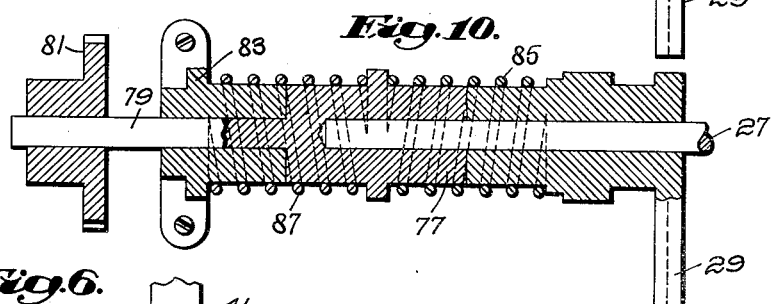
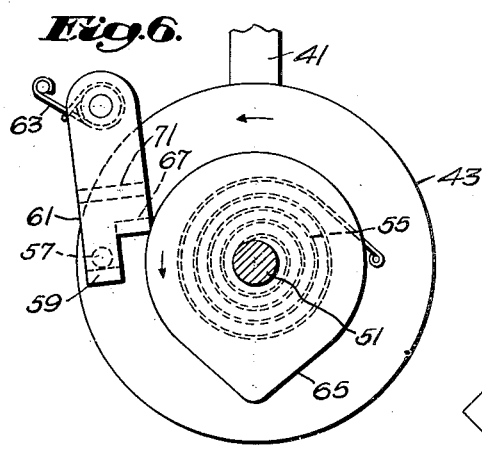
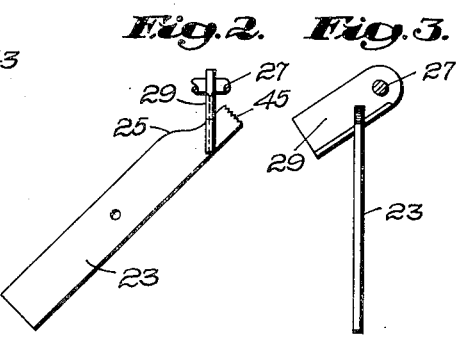
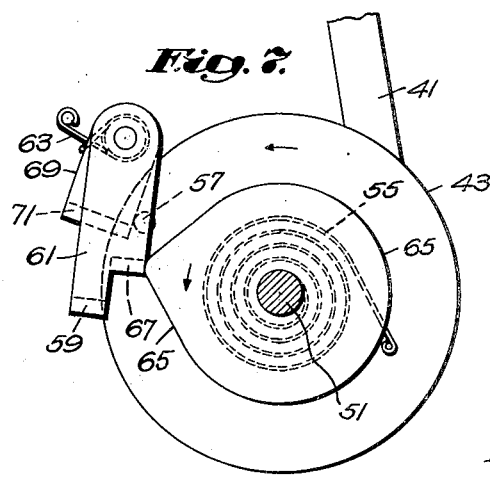
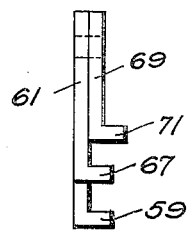
Inventor:
Earle Buckingham
by Emery, Booth, Janney & Varney
Attys Patented Nov. 3, 1931

1,830,087

UNITED STATES PATENT OFFICE

EARLE BUCKINGHAM, OF BELMONT, MASSACHUSETTS, ASSIGNOR TO THE FOXBORO COMPANY, OF FOXBORO, MASSACHUSETTS, A CORPORATION OF MASSACHUSETTS

INSTRUMENT FOR EXHIBITING A FUNCTION OF A VARIABLE

Application filed April 16, 1928. Serial No. 270,395.

This invention relates to mechanism for making manifest directly the values or summation of values of some varying effect which it is convenient to measure by means of some variable of which said values are a function. Thus if by means of an orifice plate or like device a differential pressure is set up in a conduit through which fluid flows under substantially constant pressure, we know that the rate of flow varies with the square root of such differential pressure. To indicate, record or integrate the flow values we may provide means for translating the movements of some measuring instrumentality which are proportional to the differential pressure into movements proportional to the square roots of such pressures.

The object of the present invention is to provide a mechanism of this character which will be simple, durable and accurate, and readily adapted for association with measuring instruments of known type. For simplicity I will in the following description refer to its application to a flow meter of the kind just referred to in which an integration of the flow is effected. For this purpose means are provided for effecting at frequent intervals movements of a counting mechanism which are proportional to the square root of the differential pressure existing at the moment. These movements are effected substantially instantaneously so as not to interfere objectionably with the continuous response of the measuring instrumentality to the variations in differential pressure.

My invention will be well understood by reference to the following description of the illustrative embodiment thereof shown by way of example in the accompanying drawings, wherein:

Fig. 1 is a front elevation of the integrating mechanism, portions of the measuring mechanism being shown in connection therewith;

Fig. 2 (Sheet 2) is a detailed view of an oscillating feeler arm and stop;

Fig. 3 is a side elevation thereof as seen from the right in Fig. 2;

Fig. 4 (Sheet 1) is a detailed front elevation of the oscillating mechanism for the feeler shaft and of the lock for the stop;

Fig. 5 is a side view of the same as seen from the right in Fig. 4;

Fig. 6 (Sheet 2) is a vertical section showing on an enlarged scale driving means for the oscillating mechanism;

Fig. 7 is a similar view shown with the parts in another position of adjustment;

Fig. 8 is a side elevation of the detent appearing in Figs. 6 and 7;

Fig. 9 is a front elevation of the feeler arm and the cranked lever which drives the integrating mechanism; and Fig. 10 is a central, vertical section therethrough.

Referring to Fig. 1 of the drawings, the mechanism which I am about to describe is there shown as mounted on a suitable base plate 11 adapted to be mounted on the back wall of a suitable case such as is commonly used for recording instruments, and it may be associated with pressure measuring instrumentalities of known form constituting any suitable type of differential pressure gage, conveniently of the recording type. In the drawings I have illustrated a fore and aft shaft 13 which is rotated proportionally to the differential pressure, for example, from a float in a mercury U-tube, as shown in the patent to E. H. Bristol, No. 1,592,415, July 13, 1926. This shaft may carry the pen arm 15 adapted to record such movements on a clock-driven polar chart of usual form. Movements of the shaft 13 corresponding to the variable which is measured may be communicated by means of the crank 17 fast thereto and connecting rod 18 to crank 19 fast on a shaft 20 parallel to fore and aft shaft 13 and so to an arm 23 on said shaft 20, one edge of this arm at 25 being shaped to a suitable contour corresponding to the square roots of the values of the variable. A transverse shaft 27 may carry a radially projecting feeler arm 29 (see Figs. 2 and 3) adapted to be swung into contact with the contoured portion 25 of arm 23 which serves to limit the downward movement of feeler arm 29. If, now, the shaft 27 is oscillated from a fixed upward limit of movement, the amplitude of its movement will be dependent upon the position of the contoured portion 25 of stop arm 23 relative thereto, such portion being so designed that the stroke of 29 will be proportional to the square root of the movement of the shaft 13 transmitted to said arm 23. The value of the flow may be made manifest through the movement of the feeler arm 29 and in particular in the present instance means are provided for transmitting such movement in one phase thereof, that is, in one direction, to a suitable registering mechanism driving the numbering wheels or counter 31 (see Fig. 1), the arrangement being such that no motion is transmitted to this counter in the opposite phase of movement of the arm.

To provide for oscillation of the shaft 27 (see Fig. 5) it may be provided with an arm 33 to which is attached a spring 35 normally tending to rock the same to move the feeler arm 29 down toward the stop surface 25. The arm 33 may carry a wrist 37 which works in a slot 39 in a pitman 41 reciprocated by a crank disc 43. The arrangement described is essentially that of a crank and rocker linkage, but it may be noted that the axis of crank disc 43 is a fore and aft one perpendicular to shaft 27 to facilitate the driving or timing of the latter from a fore and aft time shaft, as will hereinafter appear. In the position shown in Fig. 5 crank disc 43 has raised pitman 41 and arm 33 to their uppermost position, rocking shaft 27 and with it feeler arm 29 to its extreme and fixed upper position. Now, if the crank disc rotates, the slotted connection releases arm 33 to the action of the spring permitting the shaft to take a stroke of such amplitude as is permitted by the engagement of arm 29 with stop surface 25. The pitman idles with respect to arm 33 during the middle portion of the cycle of the former and on its back stroke returns arm 33 and shaft 27 to the initial position shown in Fig. 5.

To support arm 23 against the blow of the feeler arm 29 means are preferably provided for supporting it at a point remote from its pivot for a brief time as it is engaged by this arm. For this purpose (see Figs. 1 and 2) the extreme end of the arm may be provided with a plurality of fine teeth 45 adapted to frictionally engage a rough surface 47 arranged in the manner of a sector on one arm of a cranked lever 49 normally adapted to be swung by a spring 51 in such manner as to engage sector 47 with the teeth 45. Arm 49 is released to the spring for this purpose when the feeler arm 29 makes its stroke, and I have herein shown one arm of the lever as extending over and cooperating with a suitably formed surface (see Fig. 5) on arm 33 so that when arm 33 is in its upward position, as shown in Fig. 5, it will hold the rough surface 47 of arm 23 out of engagement with the end of arm 23. When, however, the pitman 41 releases arm 33 to its spring 35, the arm moves downwardly, permitting spring 51 quickly to swing lever 49 into engagement with stop arm 23. As shown in Fig. 1, stop arm 23 is thus supported during engagement of the feeler arm therewith not only at its pivot but at a point remote therefrom, the two points of support being at opposite sides of the point where the feeler arm engages the same. As the pitman returns the arm 33 to the normal position shown in Fig. 5, it will swing lever 49 counterclockwise, viewing Fig. 1, releasing arm 23. As the oscillation of the shaft 27 is very rapid, this locking of the lever will be momentary and will not substantially interfere with the continuous response of the measuring instrumentality which turns shaft 13 to the fluctuating pressure which it measures.

For oscillating shaft 27 crank disc 43 is periodically given a single rapid revolution. To govern this action suitable timing means in the form of a clock movement, indicated generally at 50 in Fig. 1, may be utilized. The movement therein indicated is a motor clock which is in effect a synchronous motor adapted to be driven from an alternating current electrical circuit, but this is not material. The timing clock movement conveniently has a fore and aft shaft and may or may not be utilized to drive also the polar chart on which the pen 15 records. In the embodiment of the invention herein shown the clock movement also provides the power for rotating the crank disc. To facilitate the following description by using a particular example and not by way of limitation, I may say that in one practical embodiment of the invention I effect a single revolution of the crank disc 43 once every minute and in about one-half a second.

In the embodiment of the invention shown the crank disc 43 is loosely mounted on a shaft 51 adapted to be driven by suitable gears 53 from the time movement and is adapted to be rotated by suitable power means, herein exemplified (see Figs. 6 and 7) by a spiral spring 55 which is adapted to be wound up by movement of said shaft 51. To hold the disc 43 stationary between its periodic movements, it may be provided with a tooth 57 which herein takes the form of a pin projecting from the forward face thereof which is adapted to rest upon the rearwardly directed flange 59 of a swinging detent 61 normally pressed to the position of Fig. 6 by a spring 63. Mounted on the shaft 51 is a suitable cam 65 having a rise or nose portion which will engage the detent 61 and push it to the left, viewing Fig. 6, against the force of the spring 63. When this takes place once in the minute, tooth 57 escapes over the right hand edge of stop flange 59, releasing disc 43 to the action of spring 55 which has been tensioned by the rotation of the shaft during the past minute and the disc flies around rapidly in a counterclockwise direction, oscillating pitman 43. As I have indicated, such revolution may take about half a second. A cam 65 in the example imagined makes one revolution per minute, obviously the cam has advanced very slightly in this time. I therefore provide the detent 61 with another stop flange 67 disposed inwardly of and above the flange 59 so that when the detent 61 is displaced by cam 65 to the position of Fig. 7, said stop 67 will be in the path of tooth or pin 57 to bring crank disc 43 to rest after it has completed what to all intents and purposes is a complete revolution. In Fig. 7 the parts are shown in the position which they occupy just previous to the engagement of the tooth 57 with this stop 67. Then as the cam moves on, releasing the detent 61 which swings to the right, the tooth 57 may be released over the left hand edge of flange 67 and dropped a very slight amount, the parts resuming the position of Fig. 6.

A dog 69 may be pivoted with detent 61, said dog having a retaining flange 71 (see Fig. 8). The edge of this dog 69 may be presented in the path of tooth 57 so that it may be displaced thereby in the manner indicated in Fig. 7 and be adapted to swing in in the rear of the same to prevent recoil as it encounters the stop flange 67.

In the embodiment of the invention herein shown the feeler arm 29 is adapted to drive the counting mechanism 31 on its down stroke and moves idly thereto on its up stroke. To effect this I preferably utilize the mechanism shown in Figs. 9 and 10. Herein I have shown the arm 29 as organized on the end of a suitable cylindrical hub 73 secured by a set screw 75 to shaft 27, this manner of connection providing for suitable adjustment in the initial position of arm 29. Aligned with the hub 73 and loosely turning on the end of shaft 27 is the cylindrical member 77 from which projects shaft 79 having secured on the end thereof of driving gear 81 through which by means of suitable change gears motion is communicated to the counting device 31. Shaft 79 passes loosely through and finds a support in a cylindrical member 83 aligned with cylinder 77 and fixedly held in non-rotatable position. Snugly embracing hub 75 and the adjacent end of cylinder 77 is a helical spring 85 of right hand pitch. A left hand spring 87 similarly snugly embraces the opposed portions of said cylinder 77 and of fixed cylinder 83. On downward movement of feeler arm 29 spring 85 constricts about the parts which carry it and thus cylindrical member 77 and with it the shaft 79 move with said arm in its downward movement. On the return movement of the arm the spring relaxes and no motion is communicated to shaft 79. This is further insured by the action of spring 87 which, while it offers no impediment to the downward motion of the parts as just described, constricts about the parts carrying it if there is any tendency of the part 77 to move in a reverse direction and locks the latter to the stationary element 83, thus preventing any such reverse movement.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In an instrument for exhibiting a function of a variable, means responsive to the values of the variable, a stop positioned thereby having a contour corresponding to said function, an exhibiting device, an actuating shaft therefor having a one-way driving connection therewith, a feeler on said shaft cooperating with said stop, means tending to move the same to an extreme position, means to actuate the feeler against the force of said means to another extreme position comprising a rotary member, power means to effect a rapid revolution of the same, a detent restraining such movement, a time movement and a cam driven thereby for periodically releasing said detent.

2. In an instrument for exhibiting a function of a variable, means responsive to the values of the variable, a stop positioned thereby having a contour corresponding to said function, an exhibiting device, an actuating shaft therefor having a one-way driving connection therewith, a feeler on said shaft cooperating with said stop, means tending to move the same to an extreme position, means to actuate the feeler against the force of said means to another extreme position comprising a rotary member, a detent therefor, a time movement, a cam driven thereby periodically to disengage said detent, and a spring interposed between said cam and member and adapted to be tensioned by the movement of said cam and on disengagement of the detent to relax and effect a rapid revolution of said member.

3. In an instrument for exhibiting a function of a variable, means responsive to the values of the variable, a stop positioned thereby having a contour corresponding to said function, an exhibiting device, an actuating shaft therefor having a one-way driving connection therewith, a feeler on said shaft cooperating with said stop, means tending to move the same to an extreme position, means to actuate the feeler against the force of said means to another extreme position comprising a rotary member, a detent therefor, a time movement, a cam driven thereby periodically to disengage said detent, and power storing means driven from said time movement and connected to said member to release its power thereto to effect a rapid revolution thereof on disengagement of said detent.

4. In an instrument for exhibiting a function of a variable, means responsive to the values of the variable, a stop positioned thereby having a contour corresponding to the function, an exhibiting device, an actuating shaft therefor having a one-way driving connection therewith, a feeler on said shaft cooperating with the stop, means tending to move the same to one extreme position, means to actuate the feeler against the force of such means to another extreme position comprising a wrist associated with the shaft, a pitman having a slotted connection therewith, a crank for reciprocating the pitman and means for periodically effecting a rapid revolution of said crank.

5. In an instrument for exhibiting a function of a variable, means responsive to the values of the variable, a stop positioned thereby having a contour corresponding to the function, an exhibiting device, an actuating shaft therefor having a one-way driving connection therewith, a feeler on said shaft cooperating with the stop, means tending to move the same to one extreme position, means to actuate the feeler against the force of such means to another extreme position comprising a rotary member, said means being constructed to cause a single oscillation of said shaft on each revolution of said member, and means for periodically effecting a single rapid revolution of said member.

6. In an instrument for exhibiting a function of a variable, means responsive to the values of the variable, a stop positioned thereby having a contour corresponding to the function, an exhibiting device, an actuating shaft therefor having a one-way driving connection therewith, a feeler on said shaft cooperating with the stop, means tending to move the same to one extreme position, means to actuate the feeler against the force of such means to another extreme position comprising a rotary member, power means for driving the same, a tooth on said member, a latch having a stop cooperating with the tooth, a timing cam operating to displace the latch to release said member, said latch having a second stop which is presented in the path of the tooth in the displaced position of the latch.

7. In an instrument for exhibiting a function of a variable, means responsive to the values of the variable, a stop positioned thereby having a contour corresponding to the function, an exhibiting device, an actuating shaft therefor having a one-way driving connection therewith, a feeler on said shaft cooperating with the stop, means tending to move the same to one extreme position, means to actuate the feeler against the force of such means to another extreme position comprising a rotary member, power means for driving the same, a tooth on said member, a latch having a projection in the path of said tooth in the normal position of the latch, a timing cam for periodically displacing said latch, said latch having a second projection for cooperating with said tooth displaced from the first in directions opposite respectively to the direction of revolution of said member and the direction of displacement of the latch by said cam.

8. In an instrument for exhibiting a function of a variable, means responsive to the values of the variable, a stop positioned thereby having a contour corresponding to the function, an exhibiting device, an actuating shaft therefor having a one-way driving connection therewith, a feeler on said shaft cooperating with the stop, means tending to move the same to one extreme position, means to actuate the feeler against the force of such means to another extreme position comprising a rotary member constituting therewith a crank and rocker linkage, power means for turning said member, and means periodically effective to cause a single revolution of said member under such power.

9. In an instrument of the class described, a device responsive to the fluctuations of a variable, a pivoted arm moved thereby having an edge portion contoured to correspond to a function of the variable, a feeler periodically oscillated to engage said contour, an exhibiting device moving with said contour in one phase of its movement, and means temporarily engaging said arm at a point remote from its pivot to support the same against displacement by the feeler.

10. In an instrument of the class described, a device responsive to the fluctuations of a variable, a pivoted arm moved thereby having an edge portion contoured to correspond to a function of the variable, a feeler periodically oscillated to engage said contour, an exhibiting device moving with said contour in one phase of its movement, said arm having a rough faced end and a rough surface segment swung to engage therewith during movement of the feeler to support the arm when engaged by said feeler.

11. In an instrument of the class described, a device responsive to the fluctuations of a variable, an element moved thereby having a contour corresponding to a function of the variable, a shaft having a feeler arm extending therefrom, a crank arm on the shaft, means operating on the crank arm for oscillating the shaft to cause said feeler to engage the contour, a member movable to engage said element to support it against the blow of the feeler, said member having a portion engaging said crank arm whereby the movement of the latter controls the movement of the former.

12. In an instrument of the class described, a device responsive to the fluctuations of a variable, an element moved thereby having a contour corresponding to a function of the variable, a shaft having a feeler arm extending therefrom constructed and arranged to strike the contoured element, a crank arm on the shaft and opposing said contour, a member movable to engage said element to support it against the blow of the feeler, an arm on the shaft engaging a portion of said element whereby the movement of the latter is controlled by the oscillation of the shaft, and means for periodically oscillating said shaft and the arms carried thereby.

13. In an instrument of the class described, a device responsive to the fluctuations of a variable, a pivoted arm moved thereby having an edge portion contoured to correspond to a function of the variable, a feeler periodically oscillated to engage said contour, an exhibiting device moving with said contour in one phase of its movement, and a device moving into brief engagement with said arm to support it against said feeler, said device being advanced and retracted by the movement of said feeler from and back to initial position.

14. In an instrument of the class described, a device responsive to the fluctuations of a variable, an element moved thereby having a contour corresponding to a function of the variable, a shaft having a feeler to engage the contour, means to oscillate the shaft comprising a crank, power means for driving the crank and timing means periodically effective to cause a single revolution of the crank, and a device operated from said shaft as it moves from and back to initial position to be moved into brief engagement with said device to support it against the blow of the feeler.

15. In an instrument of the class described, a device responsive to the fluctuations of a variable, a fore and aft shaft turned thereby, an element turning on a parallel axis and taking motion therefrom, said element having a contour corresponding to a function of the variable, a transverse shaft having a radially projecting feeler arm opposing said contour, a fore and aft time shaft, a crank mechanism turning on a parallel axis, means controlled from the time shaft for periodically rotating said mechanism, and a pitman from said mechanism connected through a suitable crank arm to said transverse shaft.

16. In an instrument of the class described, a device responsive to the fluctuations of a variable, a fore and aft shaft turned thereby, an element turning on a parallel axis and taking motion therefrom, said element having a contour corresponding to a function of the variable, a transverse shaft having a radially projecting feeler arm opposing said contour and adapted to contact therewith, a fore and aft time shaft, a crank mechanism turning on a parallel axis, means controlled from the time shaft for periodically rotating said mechanism, a pitman operated by said mechanism for oscillating the said transverse shaft, an arm projecting from said latter shaft, a lever pivoted on a fore and aft axis and adapted to swing into engagement with said element to support the same against the blow of the feeler, said lever engaging said latter arm to take motion therefrom.

In testimony whereof, I have signed my name to this specification.

EARLE BUCKINGHAM.